March 17, 1970  F. J. KOHOUT  3,500,530
RING CLAMPING APPARATUS
Filed Sept. 2, 1966  2 Sheets-Sheet 1

March 17, 1970  F. J. KOHOUT  3,500,530
RING CLAMPING APPARATUS

Filed Sept. 2, 1966  2 Sheets-Sheet 2

United States Patent Office 3,500,530
Patented Mar. 17, 1970

3,500,530
RING CLAMPING APPARATUS
Frank J. Kohout, Pepper Pike, Ohio, assignor to Drum Parts, Inc., Cleveland, Ohio, a corporation of Ohio
Filed Sept. 2, 1966, Ser. No. 577,042
Int. Cl. B23p *19/04*
U.S. Cl. 29—229                                    7 Claims

ABSTRACT OF THE DISCLOSURE

Ring clamping apparatus includes a movable frame supporting ring contracting members for circumferentially tightening a split cover clamping ring about a container and cover therefor. The contracting members are moved by actuating means and have semicircular portions which first engage the ring remote from the split and subsequently engage the ring at locations proceeding toward the split.

Control means for the actuating means are provided so that the actuating means can operate in response to positioning of the frame.

The present invention relates to apparatus for attaching a closure member to a drum-like container and more particularly relates to an apparatus for contracting a split clamping ring about one end of a drum-like container to permit the ends of the ring to be fastened together.

The use of containers such as metal drums and pails, commonly requires the application of covers to the open end of the containers usually after they are filled with material to be shipped, etc. This necessitates the provision of means for attaching the covers to the containers, preferably in fluid tight relationship therewith. Split clamping rings are commonly used to clamp the covers to the containers in a manner to effect the fluid tight seal therebetween. Such rings are generally stiffly resilient steel rings which include bosses at their ends having holes therein for the reception of a bolt and nut fastener. Such fasteners draw and maintain the rings in tight engagement with the containers and covers. Due to the stiffness of the clamping rings, it is preferable, if not necessary, to provide some mechanical means for contracting the rings while inserting and tightening the fasteners connecting the ends of the rings. Devices provided by the prior art for this purpose have not been entirely satisfactory particularly for use in conjunction with high production facilities because of their low speed operation or their requiring an excessive number of line personnel to effect their operation or both.

A principal object of the present invention is the provision of a new and improved apparatus which is simple in construction, extremely fast in operation and easily operable by a single operator to urge and retain the ends of a split ring of the character referred to adjacent to each other while a fastening device is connected therebetween to tightly secure the ring about the container with the ends of the ring in their adjacent relationship.

Another object of the present invention is the provision of a new and improved apparatus for contracting a split clamping ring about a periphery of a drum-like container and which includes arcuate members movable into engagement with the split ring to urge the ring into circumferential engagement with the container.

Another object of the present invention is the provision of a new and improved apparatus for contracting a split clamping ring about a periphery of a drum-like container and which apparatus includes ring engaging members supported for vertical movement relative to the container and actuator means operable in response to positioning of the members adjacent the container to move the members into engagement with the ring so that the ring is urged tightly about the periphery of the container.

Other objects and advantages of the present invention will become apparent to those skilled in the art to which the invention relates from a consideration of the following detailed description of two preferred embodiments of the invention described with reference to the accompanying drawings which form a part of the specification and in which.

The present invention provides an improved apparatus for contracting a split ring about a periphery of a drum-like container. An apparatus embodying the present invention is particularly adapted to be used in conjunction with the manufacture and/or filling of drum-like containers on a production line basis due to the speed and simplicity of operation afforded by its use. Such an apparatus includes a pair of elevatable ring engaging members which are movable vertically toward and away from a top of a drum-like container and are movable horizontally into engagement with a split clamping ring carried on the periphery of the container to urge the clamping ring into tight engagement with the periphery of the container while the ends of the ring are being secured together.

Figure 1:
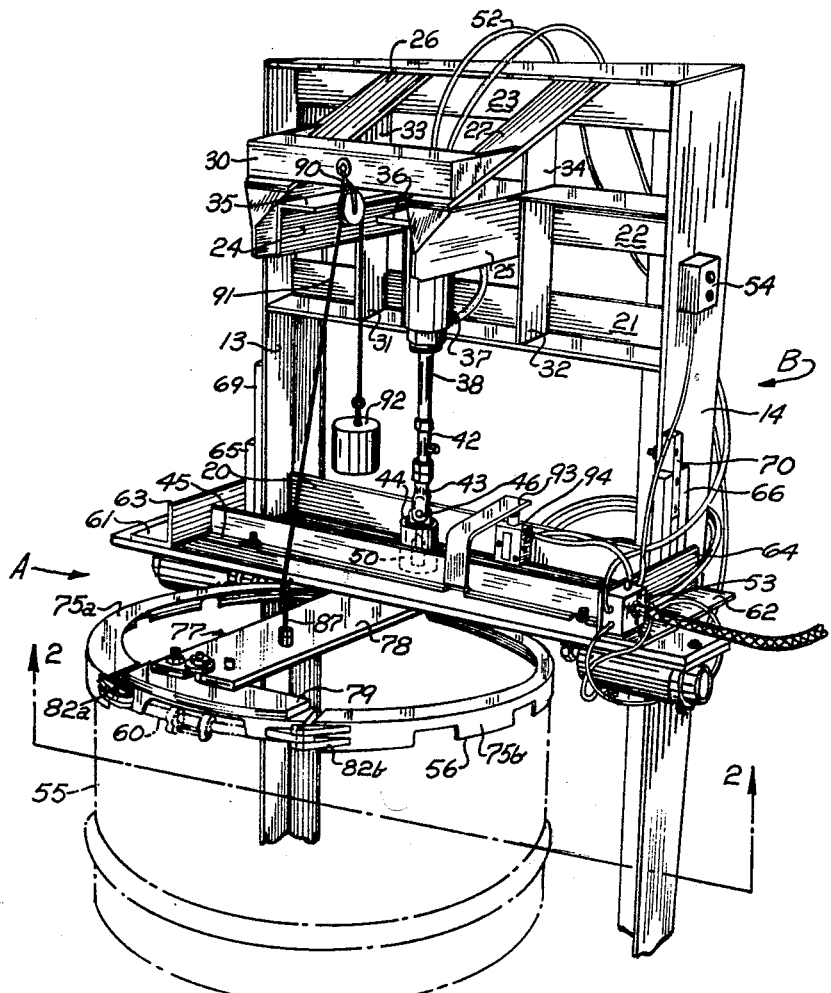
FIG. 1 is a perspective view of an apparatus embodying the present invention.

As representing a preferred embodiment of the present invention, a ring clamping apparatus 10 is shown in FIG. 1. The apparatus 10 includes an elevatable ring clamping assembly A carried by support framework B. The framework B includes vertically extending frame members 13, 14 which are preferably formed from steel angles and are rigidly supported in a vertical position by suitable supporting means which have not been illustrated. The frame members 13, 14 are spaced apart by horizontally extending members 20–23 which are preferably formed from steel angles and which are welded to frame members 13, 14. The member 22 supports two forwardly extending support members 24, 25 which are formed from steel angles and which are supported against downward bending under load by braces 26, 27 which extend from the member 23 to forward ends of the support members 24, 25. The braces 26, 27 are preferably welded to the support members 24, 25 and the member 23. The forwardly extending ends of the support members 24, 25 are connected by a support 30 which extends between the braces 26, 27 and is welded thereto. The members 21–23 are rigidly connected by plates 31, 32, 33, 34 which extend between the members and are welded thereto. The upper ends of the plates 33, 34 are welded to the braces 26, 27.

The support members 24, 25 are positioned so that flanges 35, 36 thereof extend horizontally toward each other and form a support for an actuator 37. The actuator 37 is preferably of the piston-cylinder pneumatically operated type and includes a piston rod 38 extending downwardly therefrom which is connected through an adapter 42 to a link member 43. The link member 43 is connected to a link member 44 secured to a support member 45 of the frame of the ring clamping assembly A. The support member 45 is mounted for sliding movement on the frame members 13, 14 in response to movement thereof by the actuator 37. The members 43 and 44 form a clevice joint and are secured together by a removable pin 46. The member 44 has a threaded opening extending upwardly therethrough which is engaged with a threaded stud 50 extending upwardly from the assembly A so that the member 44 may be adjusted vertically relative to the assembly A by turning the member 44 and advancing the member along the threads of the stud 50.

Opposite ends of the actuator 37 are adapted to be alternatively connected to a source of pressurized air and to exhaust through conduits 51 and 52 and a valve 53. Operation of valve 53 is controlled in part by an air switch 54 which is accessible to an operator of the apparatus. While the air switch 54 has been illustrated as connected to the framework of the apparatus, a foot pedal operated switch may be employed. When the valve 53 is operated to direct air through the conduit 51 and connect the conduit 52 to exhaust or atmosphere, the actuator elevates the assembly A relative to the framework B, while operation of the valve 53 to direct compressed air into the conduits 52, etc. causes the assembly to be moved downwardly relative to the framework B.

The framework B is positioned so that the assembly A, in its lowered position, is adjacent the upper end of an upright container 55. The container 55 has been illustrated as a 55 gallon drum having a cover 56 thereon. The container 55 carries a split clamping ring 60 on its periphery and in engagement with the cover 56. The clamping ring includes enlarged end portions having holes therethrough for receiving a bolt which has not been shown. The assembly A is elevatable to a height sufficiently above the level of the top of a drum so that drums may be conveyed into position under the assembly and delivered therefrom without interference with the assembly.

The frame member 45 extends forwardly of the frame members 13, 14 in a generally horizontal plane with its ends extending outwardly from the frame members 13, 14. A pair of channel members 61, 62 are bolted to the support member 45 between each end of the support member 45 and the adjacent one of the frame members 13, 14. Each of the channel members 61, 62 are positioned so as to provide an upstanding flange extending forwardly on the support member 45 and closely adjacent the frame members 13, 14. The upstanding flanges which are indicated by the reference numerals 63, 64 support ways 65, 66 which slidably engage guides 69, 70 which are fixed to the frame members 13, 14. The ways and guides are preferably constructed from bronze and the ways are connected to the flanges 63, 64 by suitable fasteners.

The support member 45 carries actuators 71a, 71b bolted to its lower side. The actuators 71a, 71b are preferably of the piston-cylinder, pneumatically actuated type and are connected through conduits 72a and 72b, 73a and 73b to the valve 53 which communicates with the source of pressurized air. The actuators 71a, 71b include piston rods 74a, 74b which are connected at their ends to brackets 76a, 76b on the ends of the ring engaging members 75a, 75b by clevice or pivot joints which allow free movement of the piston rods 74a, 74b. The ring engaging members 75a, 75b extend forwardly from the support member 45 in a generally horizontal plane and are pivotally connected to a support 77 adjacent their forward ends.

The support 77 includes a cantilevered member 78 bolted to the lower side of the support member 45 which extends in a horizontal plane forwardly therefrom, and a support plate 79 bolted to the lower side of the cantilevered member 78 at its unsupported end. An arcuate member 80 is welded to the lower side of the plate 79 adjacent its forward edge. The arcuate member 80 includes circumferentially spaced flange portions 81a, 81b which extend vertically downwardly from the plate 79. The flanges 81a, 81b carry hinge parts 82a, 82b which are welded to the flanges 81a, 81b and which are connected to hinge parts 83a, 83b, welded to the ring engaging members 75a, 75b, respectively. The hinge parts are connected together by vertically extending cylindrical pins 84a, 84b to permit pivotal movement of the ring engaging members in a horizontal plane relative to the support 77 about the axis of the pins 84a, 84b.

The ring engaging members 75a, 75b are semicircular segments having an L-shaped cross section having horizontally extending top flanges 85a, 85b and vertically downwardly extending flanges 86a, 86b. The hinge parts 83a, 83b and the brackets 76a, 76b are welded to the vertically extending flanges 86a, 86b of the ring engaging members.

In order to prevent downward deflection of the cantilevered member 78, a counterweight arrangement may be provided. The arrangement shown includes an eye member 87 secured to the cantilevered member 78 and a pulley 90 connected to the brace 30. A cable 91 is connected to the eye 87, threaded through the pulley 90, and carries a counterweight 92 at a free end thereof. Supporting the member 78 by the counterweight insures that the movement of the ring engaging members will be in a substantially horizontal plane.

Figure 2:
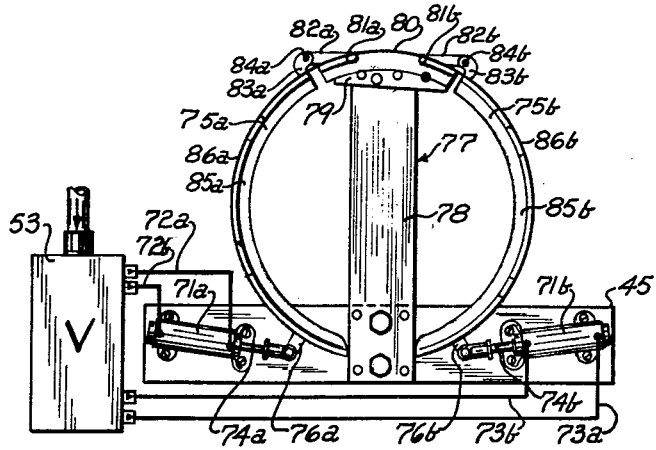
FIG. 2 is an elevation view of a portion of the apparatus shown in FIG. 1.

When the ring engaging members 75a, 75b are in the position shown in FIG. 2, the diametrical extent of the members is larger than that of a container to be sealed so that the members 75a, 75b may fit loosely about the periphery of the container. When air pressure is directed from the valve 53 through the conduits 73a, 72a to the actuators 71a, 71b, the piston rods 74a, 74b are moved toward each other causing the ring engaging members to pivot about the pins 84a, 84b and move toward the periphery of the container. A split ring in engagement with the periphery of the container will be engaged by the members 75a, 75b and urged into tight engagement with the periphery of the container. As the ring engaging members 75a, 75b are pivoted into engagement with the container, relative motion between the periphery of the container and the downwardly extending interrupted flanges 86a, 86b of the ring engaging members will occur. To prevent binding between the flanges 86a, 86b of the periphery of the container the actuator 71a, 71b are mounted on an axis which are angled slightly from the longitudinal axis of the support member 45. This angle, as shown in FIG. 2, is preferably approximately 4 degrees. As a result of the angularity between the actuators and the support member 45 the force exterted by the actuators on the ring engaging members is generally tangential so that relative motion between the periphery of the container and the ring engaging members is encouraged as the ring engaging members are moved into engagement therewith.

The actuators 71a, 71b are energized in response to the position of support member 45 relative to the framework B. The support member 45 carries an arm 93 which is welded to the support member and which extends rearwardly from the support member to a point vertically above the cross bar 20. When the support member 45 is in the position shown in FIG. 1, the arm 93 engages an air switch 94 mounted on the cross bar and which is operative to actuate the valve 53 to direct air to the actuators 71a, 71b causing the actuators to move the ring engaging members 75a, 75b into engagement with the periphery of the container. When the ring engaging members have engaged the container as described, the ends of the ring 60 are moved adjacent each other so that a fastener such as a bolt may be secured between the ends of the ring. When the ends of the ring have been secured about the container the valve 53 is actuated by the operator to direct air to the actuator 37 through the conduit 51 to raise the support member 45 relative to the framework B and the container. As the support member 45 is raised relative to the framework B the arm 93 moves out of engagement with the air switch 94 causing the valve 51 to direct compressed air through the conduits 72b, 73b to the actuators 71a, 71b to increase the diametrical extent of the ring engaging members 75a, 75b as shown in FIG. 2.

Operation of the apparatus should be apparent from the foregoing description. A drum-like container 55 carrying a split clamping ring 60 on its periphery to hold a cover member 56 in engagement with the container is moved into a position below the ring engaging members 75a, 75b with the ends of the ring positioned on a forward side of the container, as viewed in FIG. 1. While the container is being positioned the support member 45 and the ring engaging members carried thereby are held in their elevated position by the actuator 37. The operator then actuates a valve 53 by operating a switch 54 to direct air through the conduit 52 to the actuator 37 to lower the support member relative to the frame member and to move the ring engaging members into position about the periphery of the container. During the latter part of the movement of the ring engaging members about the periphery of the container the arm 93 actuates the air switch 94 directing air from the valve 53 through the conduits 72b, 73a to the actuators 71a, 71b causing the ring engaging members to move the ring engaging members into engagement with the split clamping ring. As mentioned the ends of the split clamping ring are at the forward side of the container and extend between the downwardly extending flanges 81a, 81b of the arcuate member 80 so as to be accessible to the operator. The ring can now be clamped to the container for example by securing the ends of the ring by bolt and nut arrangement. When the ends of the ring have been secured, the operator will actuate the valve 53 to direct air through the conduit 51 to the actuator 37 to cause raising or elevating of the support member 45 relative to the drum. As the support member begins to be elevated the arm 93 moves out of engagement with the air switch 94 causing the valve 53 to direct compressed air to the actuators 71a, 71b through the conduits 72a, 73b to pivot the ring engaging members to their expanded position. When the actuator 37 has reached the limit of its travel, the drum is removed from its position and a subsequent drum is positioned relative to a ring engaging member.

Figure 3:
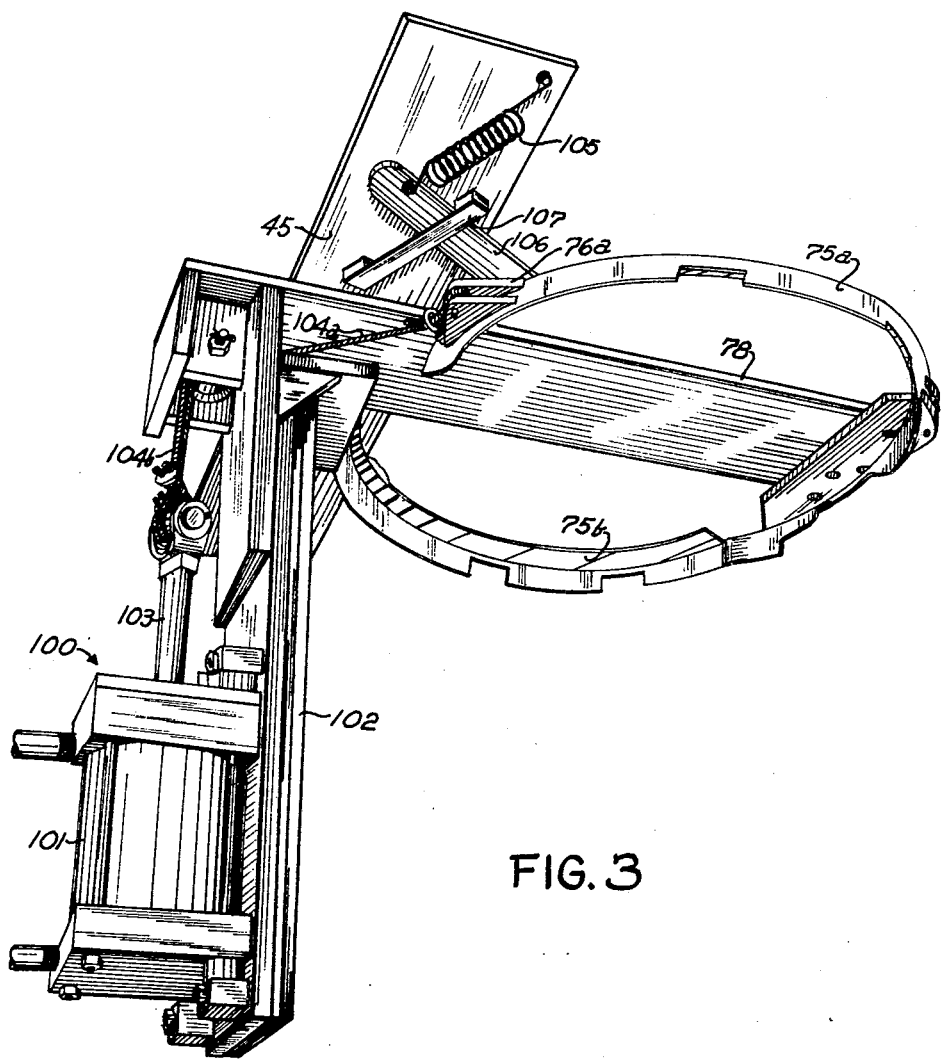
FIG. 3 is a fragmentary perspective view of an alternative construction.

An alternative arrangement for moving the ring engaging members toward and from one another is shown in FIG. 3. In the arrangement shown in this figure the power actuators 71a, 71b are replaced by a single pneumatic power actuator 100. The actuator 100 is preferably of the double-action cylinder-piston type. The actuator 100 is located at the rear of the apparatus as viewed in FIG. 1, that is, at the side opposite to the operator's side or position. The cylinder member 101 of the actuator 100 is connected to a plate-like vertical frame member 102 extending downwardly from the support member 45 which in this instance has the member 78 connected to its upperside. The member 102 is a part of the ring clamping assembly and moves vertically with the member 45. The piston rod member 103 of the power actuator 100 is connected to the brackets 76a, 76b on the rear end of the ring engaging members 75a, 75b by cables 104a, 104b each of which engages over two grooved guide rollers or sheaves the first of which is supported for rotation about a horizontal axis and the second about a vertical axis. From the second guide rollers the cables extend to the ring engaging members 75a, 75b in directions generally tangent to the ring engaging members. In this embodiment each of the ring engaging members is biased in an expanded direction by a spring 105 connected to a member 106 welded to their rear ends and to the support member 45. The ends of the members 75a, 75b to which the cables 104a, 104b are connected are supported for slidable movement by members 106 welded thereto and engaged between the support member 45 and brackets 107 connected to the underside of the member 45.

In the embodiments of the invention shown the ring clamping assemblies are linearly movable vertically to engage with or clear the top of the container. It is to be understood that the assembly may be constructed so as to pivot about an axis at or adjacent to the rear of the apparatus. Alternatively the ring clamping assembly may be fixedly secured to the frame and the drum raised into operating position therein and later lowered therefrom after the ring has been secured on the drum. In other words, the assembly may be elevatably connected to the frame proper in any suitable manner, or other suitable arrangements made for effecting relative movement between the ring closing assembly and the container to properly position the ring closing mechanism and remove it therefrom. It is also to be understood that the apparatus of the present invention can be incorporated in an automatic or semi-automatic assembly line wherein the controls are actuated automatically without attention from an operator, for example, by the position of a container moving along an intermittently-operated conveyor, etc. including time delay devices, if desired.

It should be apparent that the objects heretofore enumerated and others have been accomplished and there has been provided an improved apparatus for contracting a split clamping ring about a periphery of a drumlike container. Although the preferred embodiment of the present invention has been described in considerable detail, the invention is not limited to the precise construction shown, the frame structure for supporting the elevatable assembly may be modified according to the environment in which the apparatus is to be used, and similarly the location of the control switches may be changed without altering their function. The intention is to cover hereby all adaptations, modifications and uses of the apparatus shown which come within the practice of those skilled in the art to which the invention relates and within the scope of the appended claims.

Having described my invention, I claim:

1. An apparatus for contracting a split cover clamping ring about a container, said apparatus having an operator station at which split ends of said ring are located accessible to an operator for fastening said ends together while the ring is contracted and comprising: a support body, a ring contracting assembly connected to said body for movement toward and away from position adjacent the cover on a container means operable to move said assembly, said assembly including a frame member and ring engaging members pivotally connected to said frame member at spaced locations, and power operated actuating means connected to said ring engaging members for effecting movement of said ring engaging members toward each other to contract said ring, said ring engaging members each having a surface movable into pressure engagement with the ring by said actuating means and initially engageable with the ring at a location remote from said split ends and subsequently at successive locations proceeding toward such split ends.

2. An apparatus as claimed in claim 1, wherein said ring engaging members are spaced elongate members and said power operated actuating means includes force applying members connected to each ring engaging member at an end portion remote from said operator station, said force applying members connected to said ring engaging members to exert a force generally tangentially of a ring while moving said members.

3. In an apparatus for contracting a split cover clamping ring about a periphery of a generally cylindrical container to sealingly engage a cover member thereto; a ring clamping assembly comprising a frame member and first and second elongate ring engaging members having arcuately curved ring contracting portions, first and second pivot constructions connecting said frame member to end portions of said first and second ring engaging members, respectively, said pivot constructions defining pivot axes spaced closely adjacent a ring periphery and at circumferentially spaced locations at each side of a split end of a ring, and power actuating means for effecting movement of said ring engaging members about said pivot axes into pressure engagement with a ring.

4. In an apparatus as claimed in claim 3 wherein said power actuating means includes force applying members connected to said ring engaging members at end portions thereof remote from said pivot constructions for applying a ring contracting force to said ring engaging members in a direction generally tangentially of said arcuate portions.

5. In an apparatus as defined in claim 3, wherein said power actuating means comprises first and second flexible cables connected to end portions of said first and second ring engaging members respectively, at locations remote from said pivot axes.

6. An apparatus for contracting a split cover clamping ring about a container, said apparatus having an operator station at which split ends of said ring are located accessible to an operator for fastening said ends together while the ring is contracted and comprising: a support body, a ring contracting assembly connected to said body for movement toward and away from position adjacent the cover on a container means operable to move said assembly, said assembly including a frame member and ring engaging members pivotally connected to said frame member at spaced locations, and power operated actuating means connected to said ring engaging members for effecting movement of said ring engaging members toward each other to contract said ring, said ring engaging members each having a surface movable into pressure engagement with the ring by said actuating means and initially engageable with the ring at a location remote from said split ends and subsequently at successive locations proceeding toward such split ends, said ring engaging members each having an arcuate surface moved into pressure engagement with a ring by said actuating means and engaging a ring at a location remote from said ends, said arcuate surfaces each having a radius of curvature corresponding to a radius of curvature of a ring periphery when the ring is contracted and said surfaces move toward each other by said actuating means to substantially define arcs of a common circle when a ring is contracted thereby.

7. An apparatus for contracting a split cover clamping ring about a container, said apparatus having an operator station at which split ends of said ring are located accessible to an operator for fastening said ends together while the ring is contracted and comprising: a support body, a ring contracting assembly connected to said body for movement toward and away from position adjacent the cover on a container means operable to move said assembly, said assembly including a frame member and ring engaging members connected to said frame member at spaced locations, and power operated actuating means connected to said ring engaging members for effecting movement of said ring engaging members toward each other to contract said ring, said ring engaging members each having a surface movable into pressure engagement with the ring by said actuating means and initially engageable with the ring at a location remote from said split ends and subsequently at successive locations proceeding toward such split ends, said ring engaging members connected to said frame member by pivot constructions defining spaced apart pivot axes adjacent the said split ends, said power operated actuating means connected to said ring engaging members for rotating said ring engaging members about said pivot axes relative to said frame member, said actuating means including force applying members connected to each ring engaging member at an end portion remote from said pivot axes.

References Cited
UNITED STATES PATENTS

| | | | |
|---|---|---|---|
| 788,968 | 5/1905 | Walker | 100—264 X |
| 1,498,967 | 6/1924 | Higgins | 29—269 |
| 2,506,177 | 5/1950 | Scarff | 29—269 |
| 2,594,506 | 4/1952 | Sharpe | 29—238 X |
| 3,044,729 | 7/1962 | Prellwitz. | |
| 2,640,524 | 6/1953 | Carpenter | 29—235 |

OTHELL M. SIMPSON, Primary Examiner

J. C. PETERS, Assistant Examiner